US010676578B1

United States Patent
Chang et al.

(10) Patent No.: US 10,676,578 B1
(45) Date of Patent: Jun. 9, 2020

(54) INTERLAYER FILM AND LAMINATED GLASS COMPRISING THE SAME

(71) Applicant: CHANG CHUN PETROCHEMICAL CO., LTD., Taipei (TW)

(72) Inventors: Chin-Yen Chang, Taipei (TW); Cheng-Fan Wang, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 16/408,610

(22) Filed: May 10, 2019

(51) Int. Cl.
| | |
|---|---|
| *B32B 17/10* | (2006.01) |
| *C08J 5/18* | (2006.01) |
| *C08K 5/11* | (2006.01) |

(52) U.S. Cl.
CPC ............ *C08J 5/18* (2013.01); *B32B 17/10605* (2013.01); *B32B 17/10036* (2013.01); *C08J 2329/14* (2013.01); *C08K 5/11* (2013.01)

(58) Field of Classification Search
None
See application file for complete search history.

(56) References Cited

U.S. PATENT DOCUMENTS

| | | | |
|---|---|---|---|
| 4,452,935 A | 6/1984 | Nomura et al. | |
| 2016/0376413 A1* | 12/2016 | Sasaki | C08J 5/18 428/426 |
| 2019/0047262 A1* | 2/2019 | Minakuchi | B32B 27/30 |
| 2019/0069351 A1* | 2/2019 | Nakajima | B32B 7/02 |

FOREIGN PATENT DOCUMENTS

| | | |
|---|---|---|
| JP | S60210551 A | 10/1985 |
| JP | H051109 A | 1/1993 |
| JP | H05186250 A | 7/1993 |
| JP | H05270870 A | 10/1993 |
| JP | H06115981 A | 4/1994 |
| JP | H07237942 A | 9/1995 |
| JP | H08119686 A | 5/1996 |
| JP | H08119687 A | 5/1996 |
| JP | H10139500 A | 5/1998 |
| JP | H11343152 A | 12/1999 |
| WO | 2004011538 A2 | 2/2004 |
| WO | 2008057788 A1 | 5/2008 |

\* cited by examiner

*Primary Examiner* — Sheeba Ahmed
(74) *Attorney, Agent, or Firm* — Polsinelli PC

(57) ABSTRACT

The present disclosure relates to an interlayer film for laminated glass comprising: (a) polyvinyl butyral (PVB) resin having an average molecular weight (Mw) as measured by Gel Permeation Chromatography (GPC) from about 175,000 to about 210,000 Dalton; and (b) about 30 to about 50 parts per hundred (pph) of a plasticizer. The interlayer film interposed between two glass sheets forms laminated glass having a pummel adhesion value that is greater in an outer area of the laminated glass than in a middle area of the laminated glass after the laminated glass has been maintained at 50° C. and 95% relative humidity (RH) for 28 days. The laminated glass exhibits improved durability and does not delaminate over time, even in the presence of high temperature and humidity conditions.

14 Claims, 5 Drawing Sheets

US 10,676,578 B1

INTERLAYER FILM AND LAMINATED GLASS COMPRISING THE SAME

FIELD OF THE DISCLOSURE

The present technology relates to interlayer films and laminated glass comprising the same. The interlayer films provide improved adhesive properties to laminated glass, thereby helping to avoid delamination of the glass.

BACKGROUND

Laminated glass is a type of safety glass that holds together when shattered. An interlayer, typically made of polyvinyl butyral (PVB) or ethylene-vinyl acetate (EVA), is included to between two or more layers of glass. The interlayer keeps the layers of glass bonded even when if the glass is broken, and its high strength prevents the glass from breaking up into large sharp pieces. This produces a characteristic "spider web" cracking pattern when the impact is not enough to completely pierce the glass.

Laminated glass is often used when there is a possibility for human impact or where the glass could fall if shattered and also for architectural applications. For example, skylight glazing and automobile windshields typically use laminated glass. In geographical areas requiring hurricane-resistant construction, laminated glass is often used in exterior storefronts, curtain walls, and windows.

Laminated glass is also useful for increasing a sound insulation rating of windows, e.g., it significantly improves sound attenuation compared to monolithic glass panes of the same thickness. For this purpose, a special "acoustic PVB" compound can be used for the interlayer. In the case of the EVA material, no additional acoustic material is required, since the EVA provides sound insulation. An additional benefit for laminated glass for windows is the blockage of ultraviolet radiation by the PVB and EVA interlayer, A problem with laminated glass is that under high moisture and high temperature conditions, the moisture tends to penetrate openings between glass layers and the interlayer. The moisture disrupts the hydrogen bonding between the interlayer (e.g., PVB sheets) and the glass layers, resulting in delamination of the laminated glass. Therefore, improvements in adhesive properties of the interlayer are needed to avoid delamination.

SUMMARY OF THE DISCLOSURE

The present disclosure relates to interlayer films for use in laminated glass; and to laminated glass comprising the interlayer films. The interlayer films exhibit improved adhesive properties, which result in improvements in the quality and durability of the laminated glass that incorporates the interlayer films. For example, delamination of the interlayer films is avoided. The interlayer films result in laminated glass being surprisingly resistant to high moisture and high temperature conditions, even for prolonged periods. These improvements can be achieved, at least in part, by controlling the flow properties of the interlayer, including polyvinyl butyral (PVB) having a particular average molecular weight in the interlayer, and by using metals salts, plasticizers, etc.

In one embodiment, the interlayer films of the present disclosure include:
(a) polyvinyl butyral (PVB) resin having an average molecular weight (Mw) as measured by Gel Permeation Chromatography (GPC) from about 175,000 to about 210,000 Dalton; and
(b) about 30 to about 50 parts per hundred (pph) of a plasticizer;
wherein, the interlayer film interposed between two glass sheets forms laminated glass having a pummel adhesion value that is greater in an outer area of the laminated glass than in a middle area of the laminated glass after the laminated glass has been maintained at 50° C. and 95% relative humidity (RH) for 28 days. The outer area of the laminated glass is the area formed by the outer edges of the perimeter of a sheet of the laminated glass and extending inward toward the center of the sheet of the laminated glass by a distance of 5 mm; and the middle area of the laminated glass is the area in the middle of the laminated glass having a size of 50 mm×50 mm.

In some instances, the interlayer film interposed between two glass sheets forms laminated glass having a pummel adhesion value that is essentially unchanged in the middle area of the laminated glass, even after the laminated glass is maintained at 50° C. and 95% relative humidity (RH) for 28 days.

As already noted, the PVB resin of embodiments of the disclosure typically has an average molecular weight from about 175,000 to about 210,000 Dalton. In some instances, it can be useful if the PVB resin also have at least 10 wt. % of PVB having a Mw of less than 50,000.

Non-limiting examples of plasticizers include monobasic acid esters, polybasic acid esters, organic phosphoric acids, organic phosphorus acids, and a mixture thereof.

The interlayer films of various embodiments may include metal salts, for example, a sodium salt, a potassium salt, or a mixture thereof. The total amount of sodium salt, potassium salt, or a mixture thereof may be, for example, a positive amount up to about 80 parts per million (ppm) as sodium content, potassium content, or a mixture thereof. In some instances, the sodium salt does not exceed 40 ppm as sodium content and the potassium salt does not exceed 40 ppm as potassium content.

Finally, the instant disclosure relates to laminated glass comprising the interlayer films described herein.

BRIEF DESCRIPTION OF THE DRAWINGS

Implementations of the present technology will now be described, by way of example only, with reference to the attached figures, wherein.

Figure 1:
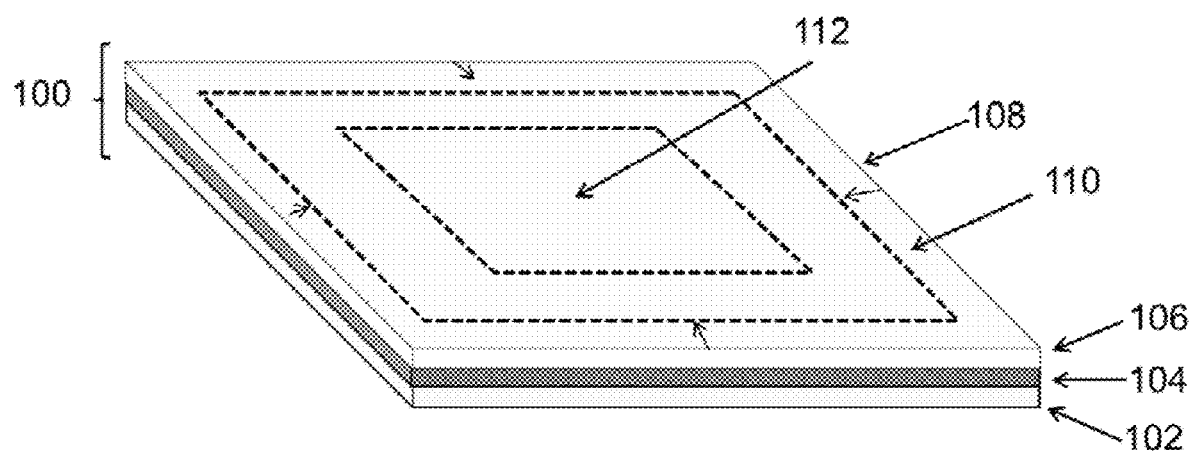
FIG. 1 is a diagram showing an example of laminated glass.

It should be understood that the various aspects are not limited to the arrangements and instrumentality shown in the figures.

DETAILED DESCRIPTION OF THE DISCLOSURE

In one embodiment, the interlayer films of the present disclosure include:

(a) polyvinyl butyral (PVB) resin having an average molecular weight (Mw) as measured by Gel Permeation Chromatography (GPC) from about 175,000 to about 210,000 Dalton; and
(b) about 30 to about 50 parts per hundred (pph) of a plasticizer;

wherein the interlayer film interposed between two glass sheets forms laminated glass having a pummel adhesion value that is greater in an outer area of the laminated glass than in a middle area of the laminated glass after the laminated glass has been maintained at 50° C. and 95% relative humidity (RH) for 28 days. The outer area of the laminated glass is the area formed by the outer edges of the perimeter of a sheet of the laminated glass and extending inward toward the center of the sheet of the laminated glass by a distance of 5 mm; and the middle area of the laminated glass is the area that is the area in the middle of the laminated glass having a size of 50 mm×50 mm.

The interlayer films typically have a flow of at least 250 µm. The term "flow", as used herein, is the deformation (reduction in thickness) when a load pressure is applied to the surface of the interlayer film in the thickness direction, upon heating from an initial temperature to a final temperature, measured using a thermomechanical analysis apparatus.

The flow of the interlayer films is typically at least 250 µm, and in some instances may be as high as 500 µm. In some instances, the flow of the interlayer films may be from 250 µm to 450 µm, from 250 µm to 400 µm, from 250 µm to 350 µm, from 250 µm to 300 µm, from 255 µm to 500 µm, from 255 µm to 450 µm, from 255 to 400 µm, from 255 to 350 µm, from 255 µm to 300, from 260 µm to 500 µm, from 260 to 450 µm, from 260 µm to 400 µm, from 260 µm to 350 µm, or from 260 µm to 300 µm.

The PVB resin of the interlayer films of the present disclosure typically has an average molecular weight from about 175,000 to about 210,000 Dalton. In some instances, the PVB resin typically has an average molecular weight from about 175,000 to about 205,000 Dalton, about 175,000 to about 200,000 Dalton, about 180,000 to about 210,000 Dalton, about 180,000 to about 205,000 Dalton, or about 180,000 to about 200,000 Dalton.

In some instances, it can be useful for the PVB resin to include at least 10 wt. % of PVB having a Mw of less than 50,000. Moreover, in some cases, the PVB resin includes at least 11 wt. %, at least 12 wt. %, or at least 13 wt. % of PVB having a Mw of less than 50,000. For example, the PVB resin may include about 10 to about 25 wt. % of PVB having a Mw of less than 50,000. In some instances, the PVB resin may include about 11 to about 25 wt. %, about 11 to about 20 wt. %, about 12 to about 25 wt. %, about 12 to about 20 wt. %, about 13 to about 25 wt. %, or about 13 to about 20 wt. % of PVB having a Mw of less than 50,000.

In some instances, it can be useful for the PVB resin to have a degree of butyralization of about 60 to about 80 mol. %. In some cases, the degree of butyralization may be about 60 to about 75 mol. %, about 60 to about 70 mol. %, about 65 to about 80 mol. %, about 65 to about 75 mol. %, or about 65 to about 70 mol. %.

As already noted, the interlayer films of the present disclosure can include one or more plasticizers. Non-limiting examples of useful plasticizers include monobasic acid esters, polybasic acid esters, organic phosphoric acids, organic phosphorus acids, and a mixture thereof. More specific yet non-limiting examples include dipropylene glycol dibenzoate, 2,2,4-trimethyl-1,3-pentanediol dibenzoate, triethylene glycol di-(2-ethylhexanoate), tetraethyleneglycol di-(2-ethylhexanoate), triethylene glycol di-(2-ethylbutyrate), triethylene glycol diheptanoate, tetraethylene glycol diheptanoate, dihexyladipate, dioctyladipate, hexyl cyclohexyladipate, diisononyladipate, heptylnonyladipate, dibutylsebacate, triethylene glycol bis(2-ethylhexanoate)(3GO), tetraethylene glycol di-2-ethylbutyrate (4GH), bis[2-(2-butoxyethoxy)ethyl] adipate (D600) and a mixture thereof.

The interlayer films of the present disclosure can include about 30 to about 50 parts per hundred (pph) of plasticizer. In some cases, the amount of plasticizer is from about 35 to about 50 pph or about 35 to about 45 pph.

The interlayer films of the present disclosure may optionally include a salt, for example, a sodium salt, a potassium salt, or a mixture thereof. Non-limiting examples of sodium salts include sodium perchlorate, sodium formate, sodium acetate, sodium 2-ethylbutyrate, sodium 2-ethylhexanoate, and a mixture thereof. Non-limiting examples of potassium salts include potassium perchlorate, potassium formate, potassium acetate, potassium 2-ethylbutyrate, potassium 2-ethylhexanoate, and a mixture thereof. The interlayer films may include only sodium salt(s), only potassium salt(s), or a combination of both sodium and potassium salt(s).

The total amount of sodium and/or potassium salt(s) may be about 10 to about 80 parts per million (ppm) of sodium content, potassium content, or mixture thereof. In some instances, the total amount of sodium and/or potassium salt(s) may be about 15 to about 80 ppm, about 20 to about 80 ppm, about 30 to about 80 ppm, about 40 to about 80 ppm, about 45 to about 80 ppm, about 10 to about 75 ppm, about 20 to about 75 ppm, about 30 to about 75 ppm, about 40 to about 75 ppm, or about 50 to about 75 ppm of sodium content, potassium content, or mixture thereof.

The total amount of sodium salt(s) may be about 10 to about 80 ppm, about 10 to about 70 ppm, about 10 to about 60 ppm, about 10 to about 50 ppm, or about 10 to about 40 ppm sodium content. Similarly, the total amount of potassium salt(s) may be about 10 to about 80 ppm, about 10 to about 70 ppm, about 10 to about 60 ppm, about 10 to about 50 ppm, or about 10 to about 40 ppm potassium content. Thus, in some instances, the total amount of sodium salt does not exceed 40 ppm as sodium content and/or the total amount of potassium salt does not exceed 40 ppm as potassium content.

The interlayer films of the instant disclosure, when interposed between two glass sheets, form laminated glass that provides a pummel adhesion value that is greater in the outer area of the laminated glass than in the middle area of the laminated glass after the laminated glass has been maintained at about 50° C. and about 95% relative humidity (RH) for 28 days. The outer area of the laminated glass is the area formed by the outer edges of the perimeter of a sheet of laminated glass extending inward toward the center of the sheet of laminated by a distance of 5 mm. The middle area of the laminated glass is the area that is the area in the middle of the laminated glass having a size of 50 mm×50 mm.

The total area and the thickness of the interlayer film can vary. The area of the interlayer film will typically be dictated by the size of laminated glass in which the interlayer film is used. With respect to thickness, the interlayer film may have a thickness of about 0.3 mm to about 1.5 mm. In some instances, the thickness may be about 0.4 to about 1.5 mm, about 0.5 to about 1.5 mm, about 0.6 to about 1.5 mm, about 0.7 to about 1.5 mm, about 0.8 to about 1.5 mm, about 0.9 to about 1.5 mm, about 1 to about 1.5 mm, about 0.3 to about 1.4 mm, about 0.3 to about 1.3 mm, about 0.3 to about 1.2 mm, about 0.3 to about 1.1 mm, about 0.3 to about 1 mm, or about 0.5 to about 1 mm.

The pummel adhesion value of the outer area of the laminated glass comprising the interlayer films of the instant disclosure is greater than the pummel adhesion value of the middle area of the laminated glass after the laminated glass is maintained at 50° C. and 95% relative humidity (RH) for 28 days. For example, the pummel adhesion value may be greater by at least 1, at least 2, at least 3, at least 4, or at least 5.

In some instances, the pummel adhesion value of the outer area of the laminated glass is at least 7, after the laminated glass is maintained at 50° C. and 95% relative humidity (RH) for 28 days. Similarly, the pummel adhesion value of the outer area of the laminated glass after the laminated glass is maintained at 50° C. and 95% relative humidity (RH) for 28 days may be at least 8 or at least 9. Furthermore, the pummel adhesion level of the outer area of the laminated glass may be at least 7, 8, or 9, and the pummel adhesion value of the outer area of the laminated glass is greater than the pummel adhesion value of the middle area of the laminated glass by at least 1, 2, 3, 4, or 5, after the laminated glass is maintained at 50° C. and 95% relative humidity (RH) for 28 days.

The pummel adhesion value of the middle area of the laminated glass after the laminated glass is maintained at 50° C. and 95% relative humidity (RH) for 28 days may be 2 to 8. In some instances, the pummel adhesion value of the middle area of the laminated glass after the laminated glass is maintained at 50° C. and 95% relative humidity (RH) for 28 days is 2 to 7, 3 to 8, 3 to 7, 4 to 8, or 4 to 7. Furthermore, the pummel adhesion value of the middle area of the laminated glass may be 2 to 8, 2 to 7, 3 to 8, 3 to 7, 4 to 8, or 4 to 7; and the pummel adhesion value of the outer area of the laminated glass is greater than the pummel adhesion value of the middle area of the laminated glass by at least 1, 2, 3, 4, or 5, after the laminated glass is maintained at 50° C. and 95% relative humidity (RH) for 28 days.

Furthermore, the pummel adhesion value of the outer area of the laminated glass is typically higher after the laminated glass is maintained at 50° C. and 95% relative humidity (RH) for 28 days than before the laminated glass is maintained at 50° C. and 95% relative humidity (RH) for 28 days. In other words, maintaining the laminated glass at a temperature of 50° C. and 95% relative humidity (RH) for 28 days results in the pummel adhesion value of the outer area of the laminated glass increasing. The pummel adhesion value may increase by 1, 2, 3, 4, or 5. For example, if the pummel adhesion value of the outer area of the laminated glass is initially 4 (i.e., the pummel adhesion value before the laminated glass is maintained at 50° C. and 95% relative humidity (RH) for 28 days is 4), the pummel adhesion value may increase by 1, 2, 3, 4 or 5, to a pummel adhesion value of 5, 6, 7, 8, or 9 after the laminated glass is maintained at 50° C. and 95% relative humidity (RH) for 28 days. Similarly, for example, an initial pummel adhesion value of 6 may increase to 7, 8 or 9; an initial pummel adhesion value of 7 may increase to 8 or 9; and an initial pummel adhesion value of 8 may increase to 9.

The instant disclosure not only relates to the interlayer films that provide improved pummel adhesion values to laminated glass sheets, but it also relates to the laminated glass sheets comprising the interlayer films. Typically, the size (area) of the laminated glass sheets will vary based on the use or application for the laminated glass sheets. Some uses or applications require larger pieces of laminated glass sheets (laminated glass having a larger area), for example, large windows, walls, building exteriors, etc. On the other hand, some uses or applications require smaller pieces of laminated glass sheets, for example, mobile phones, computer screens, wristwatches, etc.

With respect to thickness, the laminated glass sheets can have a thickness of about 2 mm to about 8 mm. In other words, the thickness of two sheets of glass and an interlayer film interposed between the two sheets of glass can be about 2 mm to about 6 mm, about 3 mm to about 6 mm, about 4 mm to about 6 mm, about 2 mm to about 5 mm, about 3 mm to about 5 mm, or about 4 mm to about 5 mm. Each individual sheet of glass of the laminated glass sheets may the same thickness or a different thickness. For example, the thickness of an individual glass sheet may be from about 0.5 mm to about 3 mm, about 1 mm to about 3 mm, or about 1 mm to about 2 mm.

FIG. 1 is a diagram showing an example structure of a laminated glass according to an aspect of the present disclosure. As shown in FIG. 1, laminated glass 100 includes three layers. The first layer is a bottom layer 102, which is a glass sheet. The second layer is an interlayer 104 which is also referred to as interlayer film 104. The third layer is an upper layer 106 which is also a glass sheet. Bottom layer 102 and upper layer 106 may also be referred to as first layer 102 and third layer 106, respectively. The laminated glass 100 has an outer area 110 formed by an outer edges of a perimeter 108 of the laminated glass 100 and a middle area 112 of the laminated glass 100 that is the area in the middle of the laminated glass having a size of 50 mm×50 mm.

Figure 2A:
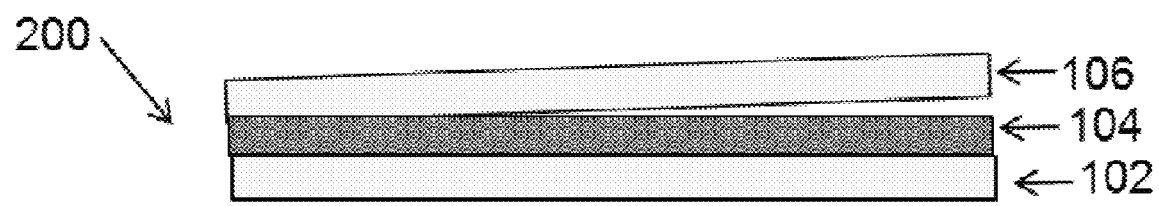
FIG. 2(a) is an illustration of laminated glass, wherein the interlayer film has poor flow properties leading to delamination.
Figure 2B:
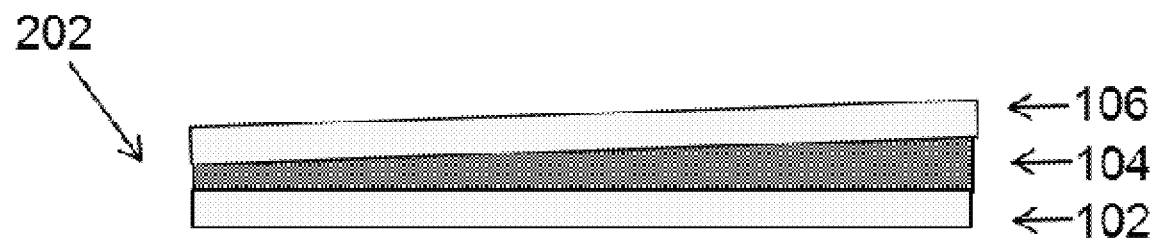
FIG. 2(b) is an illustration of laminated glass, wherein the interlayer film has good flow properties and therefore avoids delamination.

FIG. 2(a) shows laminated glass in which the interlayer has "poor flow." In example structure 200, there is gap between upper layer 106 and interlayer 104. FIG. 2(b) shows laminated glass wherein the interlayer has "good flow." In example structure 202, the good flow is such that there is no gap between upper layer 106 and interlayer 102. Increased flow results in the interlayer being able to more readily fill the gaps. This prevents moisture from penetrating between layers 102, 104, and 106, thereby preventing delamination of the laminated glass.

Figure 3:
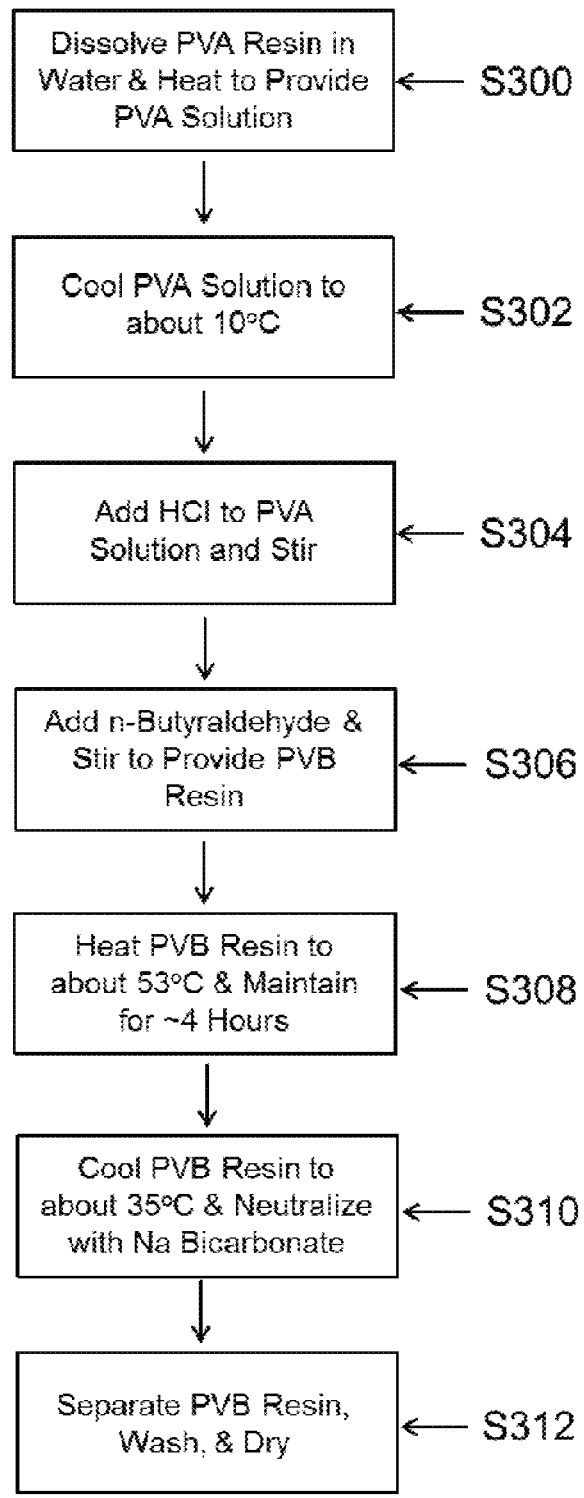
FIG. 3 is a flow diagram illustrating a process for manufacturing PVB resin.

FIG. 3 illustrates a process for preparing PVB in a preferred embodiment of the present invention. In S300, polyvinyl alcohol (PVA) resin is dissolved in water and heated to provide a PVA solution. In S302, the PVA solution of S300 is cooled to about 10° C. or lower. In S304, hydrochloric acid (HCl) is added to the PVA solution of S302 and stirred. In S306, n-butyraldehyde is added to the solution of S304 and is stirred to provide PVB resin. In S308, the PVB resin of S306 is heated to about 53° C. (e.g., about 44° C. to about 60° C.) and maintained at this temperature for about 4 hours. In S310, the PVB resin is cooled to at least 35° C. and neutralized with sodium bicarbonate. In S312, the PVB resin is separated, washed with water, and dried.

Figure 4:
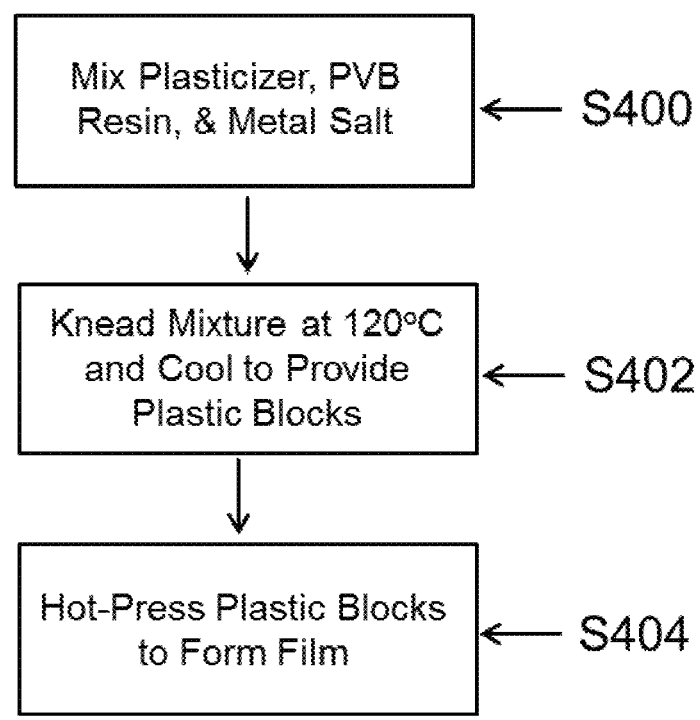
FIG. 4 is a flow diagram illustrating a process for manufacturing an interlayer film.

FIG. 4 illustrates a process for preparing an interlayer film according to the instant disclosure. In S400, plasticizer, PVB resin, and metal salts are combined. In S402, the mixture of plasticizer, PVB resin, and metal salts is kneaded and cooled to ambient temperature to provide plastic blocks. In S404, the plastic blocks of S402 are pressed with a hot-press machine to provide an interlayer film.

Figure 5:
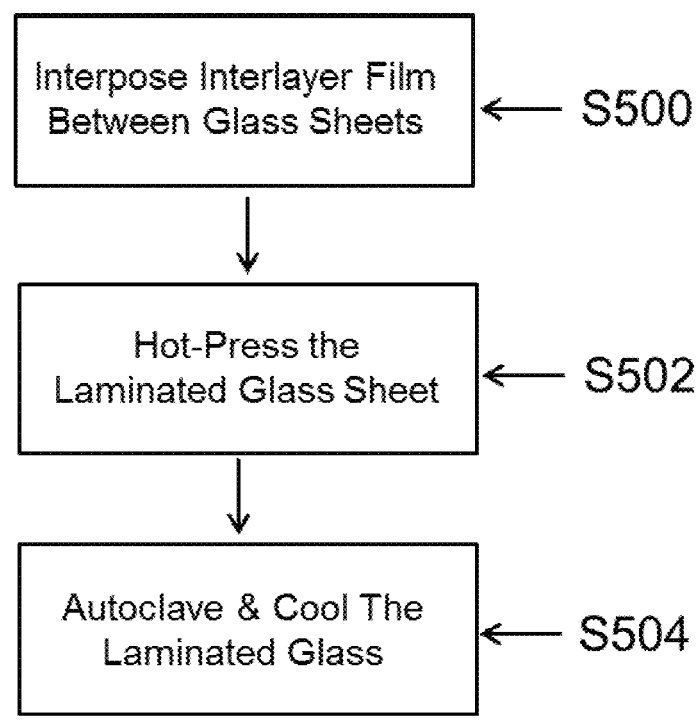
FIG. 5 is a flow diagram illustrating a process for manufacturing laminated glass.

FIG. 5 illustrates a process for preparing laminated glass according to the instant disclosure. In S500, an interlayer film is interposed between a pair of transparent float glass sheets. In S502, a hot-press is used to prepress the laminated glass sample. In S504, is autoclaved and cooled to provide laminated glass.

Determination of Average Molecular Weight

The Mw of the PVB resin can be determined according to the following procedure. A sample of interlayer film (0.08 g)

is dissolved in 15 mL of tetrahydrofuran (THF) and analyzed by Gel Permeation Chromatography (GPC) and the molecular weight is calculated from the ratio of an area corresponding to polystyrene standards (Waters PS STD). The following GPC parameters are used:
- Device: Waters 1515 PUMP system
- Detector: Waters 2414 RI
- Elution Condition: 1.0 mL/min, THF
- Column: Wateres Styrage HR5 THF, Waters Styrage HR4 THF, Waters Styrage HR3 THF, Waters STyrage HR1 THF Determination of Flow Flow is a measurement of deformation (reduction of sample thickness) when a load pressure is applied to a sample surface in the thickness direction, upon heating from an initial temperature to a final temperature, measured using a thermomechanical analysis apparatus. An interlayer film sample that has been stored in a desiccator is cut into a disc having a diameter of 6 mm. The disc is interposed between two plates and placed into a thermomechanical analyzer, for example, a TMA Q400 Texas Instrument with an expansion probe having a diameter of 2.8 mm and a Force of 1.0 N. The disc is heated from 25° C. to 145° C. at a heating rate of 10° C. per minute. The deformation (reduction of sample thickness) between 45° C. and 135° C. is measured and the flow is calculated by subtracting the thickness of the disc at 135° C. from the thickness of the disc at 45° C.

Determination of Pummel Adhesion Value

Adhesion of interlayer films to glass is measured using a pummel adhesion test, which is routinely used for quality control purposes in the laminated glass industry. A laminated glass sample (glass/interlayer film/glass) is prepared, conditioned at −18° C. for 2 hours and pummeled by an automatic pummel machine at a temperature of 20 to 25° C. The pummeling is carried out in the span of 3 minutes. The degree of exposed interlayer film of the pummeled laminated glass sample is evaluated and compared to standard samples. There is one standard sample for each pummel level. The pummeled test sample is compared with the standard samples of each pummel level to determine the pummel level of the pummeled test sample.

A laminated glass sample (150 mm wide×300 mm long) is prepared and pummeled with automatic pummel machine (e.g., GOTECH, Taiwan) having a 32 mm hammer with a weight of about 1 lb. The sample is pummeled at a horizontal interval of 9 mm and a vertical interval of 10 mm with a pummel force of 94 lb-cm/sec. The degree of exposure is then determined and categorized on a 10 point scale, shown in table 1 as below:

TABLE 1

| Degree of Exposure | Pummel Adhesion Value |
|---|---|
| 95% | 0 |
| 85% | 1 |
| 75% | 2 |
| 65% | 3 |
| 55% | 4 |
| 45% | 5 |
| 35% | 6 |
| 25% | 7 |
| 15% | 8 |
| Less than 5% | 9 |

Determination of Delamination

The laminated glass sample (150 mm wide×300 mm long) is prepared and maintained at 50° C. and 95% relative humidity (RH) for 28 days. Delamination of the edges of the laminated glass samples is determined by the naked eye at room temperature. Twenty pieces of the laminated glass samples are visually inspected for bubbling and/or delamination, and ranked according to the table 2 as below.

TABLE 2

| | Delamination test |
|---|---|
| ◉ | No bubbling or delamination |
| ○ | No delamination but some bubbling |
| X | Bubbling and delamination |

Long-Term High Temperature & High Moisture Testing

To determine the influence of long-term high temperature and high moisture on the adhesive properties of laminated glass, the laminated glass is manufactured and immediately maintained at 50° C. and 95% relative humidity (RH) for 28 days. After 28 days at 50° C. and 95% RH, the laminated glass is subjected to pummel adhesion testing, as described above.

Implementation of the present disclosure is provided by way of the following examples. The examples serve to illustrate the technology without being limiting in nature.

Example 1

Preparation of Polyvinyl Butyral Resin 100 g of polyvinyl alcohol (PVA) having a degree of polymerization of 1,700 to about 1,800, was dissolved in 807 g of water and heated to 95° C. to provide a PVA solution. The PVA solution was cooled to 10° C. and 64 g of hydrochloric acid (HCl) was added. After mixing for 10 minutes, 54 g of n-butyraldehyde was added and the mixture stirred for 15 minutes to form polyvinyl butyral (PVB). The mixture containing the PVB was heated to 53° C. and maintained at this temperature for about 4 hours. After about 4 hours, the mixture was cooled to 35° C. and neutralized with sodium bicarbonate. The PVB was separated, washed, and dried.

Example 2

Preparation of Interlayer Film

A mixture was prepared by combining 36-42 parts by weight of a plasticizer (3GO, triethylene glycol bis-(2-ethylhexanoate)) with about 100 parts by weight of a PVB resin (of Example 1) and metal salt (10-200 ppm of sodium ion or potassium ion in the final interlayer film). The mixture was kneaded at 35 rpm with a mixing machine (Brabender®, Germany, Mixer 50 EHT) at 120° C. for 15 minutes and cooled to ambient temperature to provide plastic blocks. The plastic blocks were pressed with a hot-press machine (GOTECH, Taiwan, GT-7014-A) at 150° C. for 3 minutes to provide a film having a thickness of 0.76 mm.

Example 3

Preparation of Laminated Glass

The film of Example 2 having a thickness of 0.76 mm was interposed between a pair of float glass sheets to provide a laminated glass sample. Clean float glass (thickness 2 mm, manufactured by Taiwan Glass Ind. Corp.) or SYP F Green Tinted Glass (thickness 2 mm, manufactured by Shanghai Yaohua Pilkington Glass Group Co., Ltd.) was used. Each glass sheet was 150 mm wide and 300 mm long. A hot-presser (GOTECH, Taiwan, GT-7014-A) was used to pre-press the laminated glass sample at 150° C. for 3 minutes. Following the prepress procedure, the laminated glass sample was autoclaved at 13 bar and 135° C. for 120 minutes and subsequently cooled to ambient temperature to complete the lamination process, and thus providing the laminated glass samples 1 to 8 and comparative samples C-1, C-2, and C-3. The corresponding results are shown in table 3.

|  |  | 1 | 2 | 3 | 4 | 5 | 6 | 7 | 8 | C-1 | C-2 | C-3 |
|---|---|---|---|---|---|---|---|---|---|---|---|---|
| Average degree of polymerization of PVB resin | | 1700 | 1700 | 1800 | 1800 | 1700 | 1800 | 1800 | 1800 | 1700 | 1700 | 1700 |
| Molecular weight of PVB resin | | 180952 | 186567 | 199161 | 201360 | 185673 | 197812 | 189485 | 178898 | 215533 | 226270 | 207934 |
| Amount of PVB resin having a Mw of less than 50,000 | | 16.8% | 17.6% | 15.4% | 12.8% | 15.3% | 16.2% | 17.8% | 18.5% | 15.6% | 14.8% | 5.6% |
| Amount of PVB resin having a Mw of greater than 800,000 | | 6.4% | 5.7% | 6.8% | 6.4% | 6.5% | 6.2% | 4.8% | 6.5% | 5.9% | 6.5% | 6.3% |
| Amount of plasticizer (PHR) | | 42 | 45 | 40 | 40 | 38 | 40 | 43 | 42 | 42 | 42 | 36 |
| Amount of $Na^+$ metal salt (ppm) | | 20 | 10 | 40 | 20 | 10 | 20 | 15 | 21 | 60 | 100 | 35 |
| Amount of $K^+$ metal salt (ppm) | | 5 | 30 | 20 | 0 | 0 | 5 | 32 | 22 | 70 | 160 | 39 |
| Flow (um) | | 296 | 304 | 274 | 259 | 264 | 283 | 323 | 347 | 284 | 277 | 198 |
| Pummel adhesion value of middle area | | 6 | 5 | 4 | 5 | 7 | 5 | 6 | 5 | 7 | 3 | 5 |
| Pummel adhesion value of outer area | | 6 | 5 | 4 | 5 | 7 | 5 | 6 | 5 | 7 | 3 | 5 |
| Long-Term High Temperature & Hight Moisture Testing | Pummel adhesion value of middle area | 6 | 5 | 4 | 5 | 7 | 5 | 6 | 5 | 7 | 3 | 5 |
| | Pummel adhesion value of outer area | 9 | 9 | 9 | 9 | 9 | 9 | 9 | 9 | 7 | 3 | 5 |
| | Difference of pummel adhesion value betweem middle area and outer area | 3 | 4 | 5 | 4 | 2 | 4 | 3 | 4 | 0 | 0 | 0 |
| Detamination test | | ○ | ◎ | ◎ | ○ | ○ | ◎ | ○ | ○ | X | X | X |

The results shows that the delamination test in samples 2, 3, and 6 are no bubbling or delamination and in samples 1, 4, 5, 7, and 8 are no delamination but some bubbling. While the delamination test in comparative samples C-1, C-2, and C-3, the laminated glasses exhibited bubbling and delamination.

Furthermore, the pummel adhesion value of the outer area of the laminated glass samples 1 to 8 are higher after the laminated glass samples are maintained at 50° C. and 95% relative humidity (RH) for 28 days than before the laminated glass samples 1 to 8 are maintained at 50° C. and 95% relative humidity (RH) for 28 days. In other words, maintaining the laminated glass samples 1 to 8 at a temperature of 50° C. and 95% relative humidity (RH) for 28 days results in the pummel adhesion value of the outer area of the laminated glass increasing. However, this result cannot be observed in the comparative samples (i.e. C-1, C-2, and C-3). As can be seen, the pummel adhesion values of the laminated glass samples 1 to 8 increased by 2 to 5. Especially in the laminated glass sample 3, the initial pummel adhesion value (in edge) of 4 increased to 9.

As above, the present invention provides the interlayer film and the laminated glass comprising the same, wherein the interlayer films exhibit improved adhesive properties, which result in improvements in the quality and durability of the laminated glass that incorporates the interlayer films. For example, delamination of the interlayer films is avoided. Furthermore, the interlayer films result in laminated glass being surprisingly resistant to high moisture and high temperature conditions, even for prolonged periods.

The terms "comprising," "having," and "including" are used in their open, non-limiting sense.

The terms "a" and "the" are understood to encompass the plural as well as the singular. The expression "at least one" means one or more and thus includes individual components as well as mixtures/combinations.

The term "directly" can be used in conjunction with terms such as "to" or "on" to result in phrases such as "directly on" and "directly "to." Such phrases may be especially useful when referring to components or layers and their relationship to one another. This phraseology (i.e., phraseology using the modifier "directly") indicates that components or layers that are "directly on" one another or applied "directly to" one another are in physical contact with each other such that no intervening component(s) or layer(s) is present. For example, if layer A is directly on layer B, layer A and layer B are in physical contact with each other and no intervening layer (such as a layer C) can lie between layer A and layer B.

All ranges and values disclosed herein are inclusive and combinable. For examples, any value or point described herein that falls within a range described herein can serve as a minimum or maximum value to derive a sub-range, etc.

All publications and patent applications cited in this specification are herein incorporated by reference, and for any and all purposes, as if each individual publication or patent application were specifically and individually indicated to be incorporated by reference. In the event of an inconsistency between the present disclosure and any publications or patent application incorporated herein by reference, the present disclosure controls.

Unless otherwise defined herein, scientific and technical terms used in connection with the present application shall have the meanings that are commonly understood by those of ordinary skill in the art. Further, unless otherwise required by context, singular terms shall include pluralities and plural terms shall include the singular.

It should be understood that this invention is not limited to the particular methodology, protocols, and reagents, etc., described herein and as such may vary. The terminology used herein is for the purpose of describing particular embodiments only, and is not intended to limit the scope of the present invention, which is defined solely by the claims.

The invention claimed is:

1. An interlayer film comprising:
   (a) polyvinyl butyral (PVB) resin having an average molecular weight (Mw) as measured by Gel Permeation Chromatography (GPC) from about 175,000 to about 210,000 Dalton; and
   (b) about 30 to about 50 parts per hundred (pph) of a plasticizer.

2. The interlayer film of claim 1 having a flow of at least 250 μm, wherein the flow is a reduction in thickness of a 6 mm diameter sample of the interlayer film calculated by subtracting the thickness of the sample at 135° C. from the thickness of the sample at 45° C. when placed into a thermomechanical analyzer having an expansion probe of diameter 2.8 mm and a Force of 1.0 N.

3. The interlayer film of claim 1, further comprising:
   (c) a sodium salt, a potassium salt, or a mixture thereof, in a positive amount up to about 80 ppm as sodium content, potassium content, or a mixture thereof.

4. The interlayer film of claim 3, wherein the sodium salt does not exceed 40 ppm as sodium content and the potassium salt does not exceed 40 ppm as potassium content.

5. The interlayer film of claim 1, wherein the PVB resin comprises at least 10 wt. % of PVB having a Mw of less than 50,000.

6. The interlayer film of claim 1, wherein the polyvinyl butyral resin has a degree of butyralization of 60 to 80 mol. %.

7. The interlayer film of claim 1, wherein the plasticizer is selected from monobasic acid esters, polybasic acid esters, organic phosphoric acids, organic phosphorus acids, or a mixture thereof.

8. The interlayer film of claim 1, wherein the plasticizer is selected from dipropylene glycol dibenzoate, 2,2,4-trimethyl-1,3-pentanediol dibenzoate, triethylene glycol di-(2-ethylhexanoate), tetraethyleneglycol di-(2-ethylhexanoate), triethylene glycol di-(2-ethylbutyrate), triethylene glycol diheptanoate, tetraethylene glycol diheptanoate, dihexyladipate, dioctyladipate, hexyl cyclohexyladipate, diisononyladipate, heptylnonyladipate, dibutylsebacate, triethylene glycol bis(2-ethylhexanoate)(3GO), tetraethylene glycol di-2-ethylbutyrate (4GH), bis[2-(2-butoxyethoxy)ethyl] adipate (D600), or a mixture thereof.

9. The interlayer film of claim 3 comprising one or more sodium salts selected from sodium perchlorate, sodium formate, sodium acetate, sodium 2-ethylbutyrate, sodium 2-ethylhexanoate, or a mixture thereof.

10. The interlayer film of claim 3 comprising one or more potassium salts selected from potassium perchlorate, potassium formate, potassium acetate, potassium 2-ethylbutyrate, potassium 2-ethylhexanoate, or a mixture thereof.

11. The interlayer film of claim 2 having a flow of at least 250 μm to about 500 μm.

12. The interlayer film of claim 1 having a thickness of about 0.3 mm to about 1.5 mm.

13. The interlayer film of claim 1, wherein the interlayer film interposed between two glass sheets forms laminated glass having a pummel adhesion value that is greater in an outer area of the laminated glass than in a middle area of the laminated glass after the laminated glass has been maintained at 50° C. and 95% relative humidity (RH) for 28 days,
   the outer area of the laminated glass being the area formed by outer edges of a perimeter of the laminated glass and extending inward toward the center of the laminated glass by a distance of 5 mm, and
   the middle area of the laminated glass is an area in the middle of the laminated glass having a size of 50 mm×50 mm.

14. Laminated glass comprising an interlayer film of claim 1.

* * * * *